(12) United States Patent
Cornaby et al.

(10) Patent No.: US 6,857,062 B2
(45) Date of Patent: Feb. 15, 2005

(54) BROADCAST STATE RENAMING IN A MICROPROCESSOR

(75) Inventors: Michael P. Cornaby, Hillsboro, OR (US); Lawrence O. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 10/007,151

(22) Filed: Nov. 30, 2001

(65) Prior Publication Data

US 2003/0105946 A1 Jun. 5, 2003

(51) Int. Cl.$^7$ .............................. G06F 9/48; G06F 9/38
(52) U.S. Cl. ..................... 712/226; 712/228; 712/217
(58) Field of Search ............................... 712/217, 226, 712/228; 718/107, 108

(56) References Cited

U.S. PATENT DOCUMENTS

| | | | |
|---|---|---|---|
| 5,778,243 A | * | 7/1998 | Aipperspach et al. .......... 712/11 |
| 6,341,347 B1 | * | 1/2002 | Joy et al. .................... 712/228 |
| 6,629,236 B1 | * | 9/2003 | Aipperspach et al. ....... 712/228 |

OTHER PUBLICATIONS

Chris Jesshope, "Implementing an Efficient Vector Instruction Set in a Chip Multi–Processor using Micro–Threaded Pipelines", Proceedings of the 6$^{th}$ Australasian Computer Systems Architecture Conference, IEEE, Jan. 29, 2001–Jan. 30, 2001, pp. 80–88.*

* cited by examiner

*Primary Examiner*—William M. Treat
(74) *Attorney, Agent, or Firm*—Blakely, Sokoloff, Taylor & Zafman LLP (57) ABSTRACT

A microprocessor uses broadcast state renaming to reduce processing delays and microcode overhead which would otherwise result from rebroadcasts of state due to register renaming. The microprocessor comprises a memory execution unit, a microcode sequencer, and various functional units. The memory execution unit includes a segment register, content of which represents state of the processor. The microcode sequencer sets an identifier field in at least some microinstructions, indicating which of multiple copies of broadcast state are to be used in processing each such microinstruction. Each functional unit receives and internally stores multiple copies of broadcast state, each of which may correspond to a different renamed version of the segment register. Each functional unit selects, based on the identifier field of a microinstruction, one of its internally stored copies of broadcast state for use in processing the microinstruction.

30 Claims, 4 Drawing Sheets

| UOp Code | Bcast | Bcast_State_ Change | First_bcast_ State_use | Source 1 | Source 2 |
|---|---|---|---|---|---|
| 401 | 404 | 405 | 406 | 402 | 403 |

BROADCAST STATE RENAMING IN A MICROPROCESSOR

FIELD OF THE INVENTION

The present invention relates generally to the field of microprocessors and, more specifically, to a method and apparatus for renaming broadcast state in a microprocessor.

BACKGROUND OF THE INVENTION

In a microprocessor, "state" may be defined as the value, at a given point in time, of one or more parameters used by the microprocessor in performing its functions. For example, microprocessors designed according to the Intel Architecture typically maintain a set of hardware registers, known as the "segment register file", which typically are located in the memory execution unit (MEU) of the microprocessor. Two of these registers, the code segment register and the stack segment register, have particular importance regarding processor "state". The purpose of the code segment register is to provide protection information and basic operating parameters as applied to instruction fetch (e.g., location in memory from which an instruction can be fetched, privilege levels). The purpose of the stack segment register is to indicate areas in memory where programs can read and/or write stack information, privilege levels, etc. Each of these two registers (and other registers) contains multiple bits, collectively representing the values of several different processor parameters. The term "state" commonly refers to the values of any one or more of these parameters.

A typical microprocessor includes a number of different functional units, each of which requires current state (i.e., the value of one or more of the aforementioned parameters) to perform its functions during the processing of microinstructions. Examples of such functional units in the Intel Architecture are the microinstruction checker retirement unit (CRU), instruction translation lookaside buffer (ITLB), trace cache (TC), and segment and address translation unit (SAAT). Consequently, such microprocessors commonly use a process known as state "broadcasting", in which the current state is distributed, via one or more internal buses, to the various functional units which require it. State frequently changes during operation of the microprocessor, and it must be rebroadcast to the various functional units when that occurs. State tends to change frequently in a microprocessor, such as in response to any branch in the macrocode (a "far transfer") and, when in protected mode, in response to any architectural event.

Broadcasting of state consumes microinstructions and therefore tends to have a negative performance impact on the processor, i.e., it slows down the processor. Broadcasting of state can have a more significant negative impact when used in conjunction with certain performance-enhancing technologies, such as out-of-order execution. Out-of-order execution is a well-known technique used in pipelined microprocessors to improve instruction throughput. Out-of-order execution involves selectively executing certain instructions out of order, i.e., before other instructions that occur "earlier" in the program code flow. A technique called register renaming is often used to facilitate out-of-order execution. Register renaming allows multiple execution paths without conflicts between different execution units trying to use the same registers. Rather than just one set of registers being used, multiple sets of registers are provided in the processor. This allows different execution units to work simultaneously without unnecessary pipeline stalls.

A problem associated with register renaming, however, is that it tends to increase the frequency with which state must be rebroadcast, degrading processor performance. In current microprocessors using the Intel Architecture, each functional unit stores a single copy of the state it requires (i.e., a portion or all of the code segment and/or stack segment registers). Consequently, whenever the code segment or stack segment register is renamed, state must be rebroadcast to the various functional units that require it. However, the rebroadcast cannot take place until all of the microinstructions which are based on the old state have finished executing. As a result, the microinstruction pipeline must stall until that happens, which slows down the processor. Thus, the requirement of having to frequently rebroadcast state tends to degrade performance of a microprocessor.

What is needed, therefore, is a technique which addresses the performance problems associated with rebroadcasting of state, particularly in an out-of-order microprocessor that uses register renaming.

SUMMARY OF THE INVENTION

The present invention includes a method and apparatus for storing a plurality of copies of broadcast state of a processor in each of multiple functional units of the processor. A microinstruction including an identifier is issued in the processor, and the identifier is used in at least one of the functional units to select one of the copies of broadcast state for use in processing the microinstruction.

Other features of the present invention will be apparent from the accompanying drawings and from the detailed description which follows.

BRIEF DESCRIPTION OF THE DRAWINGS

The present invention is illustrated by way of example and not limited in the figures of the accompanying drawings, in which like references indicate similar elements, and in which.

DETAILED DESCRIPTION

A method and apparatus for renaming broadcast state in a microprocessor are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include a variety of combinations and/or integrations of the embodiments described herein.

I. Overview

As described in greater detail below, a processor uses broadcast state renaming to reduce processing delays and microcode overhead which would otherwise result from having to rebroadcast state (such as in response to register renaming). The processor includes a memory execution unit, a microcode sequencer, and various functional units. The memory execution unit includes segment registers, content of which represent state of the processor. The microcode sequencer sets an identifier field in at least some microinstructions, indicating which of multiple copies of broadcast state are to be used for processing each microinstruction. Each functional unit which requires broadcast state receives and internally stores multiple copies of broadcast state. Each copy of broadcast state may correspond to a different renamed version of a segment register. When processing a microinstruction, each functional unit selects, based on the identifier field of the microinstruction, one of its internally stored copies of broadcast state for use in processing the microinstruction.

Among other advantages, this technique eliminates the need, when a rebroadcast is required, to wait for all previous microinstructions that use broadcast state to finish executing before issuing the rebroadcast. In addition, this technique reduces the need for rebroadcasts and reduces microcode overhead otherwise attributable to such rebroadcasts. Consequently, this technique improves the overall processing speed and performance of the processor.

Figure 1:
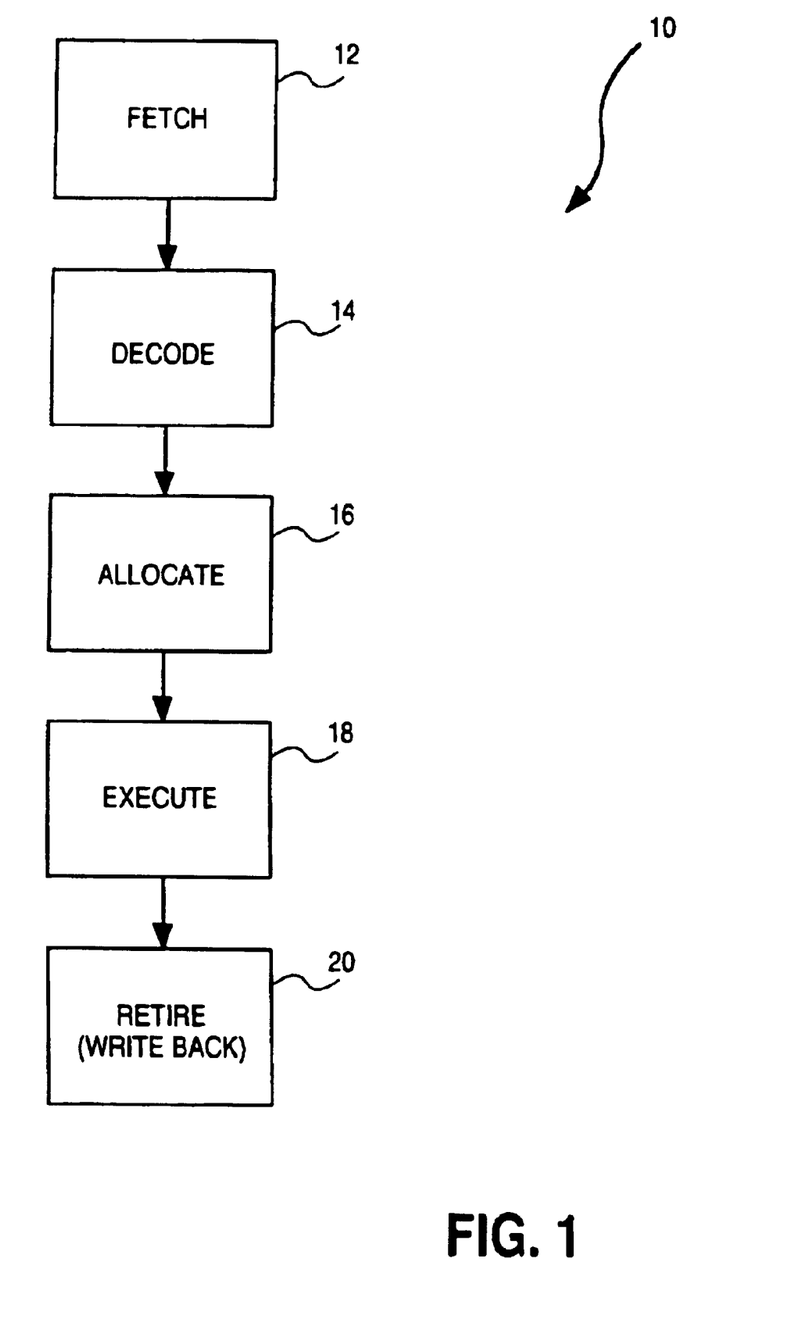
FIG. 1 is a block diagram illustrating one embodiment of a pipeline of a processor.

Before describing the broadcast state renaming technique in detail (see under heading "II. Broadcasting State", below), it is useful to consider the architecture of a microprocessor in which the technique can be implemented. FIG. 1 is a high-level block diagram illustrating one embodiment of a processor pipeline 10 used in such a processor. The pipeline 10 includes a number of pipeline stages, commencing with a fetch stage 12 at which instructions (e.g., macroinstructions) are retrieved and fed into the pipeline 10. For example, a macroinstruction may be retrieved from a cache memory that is integral with the processor, or closely associated with it, or may be retrieved from an external main memory via a processor bus. From the fetch stage 12, the macroinstructions are propagated to a decode stage 14, where macroinstructions are translated into microinstructions (also termed "microcode") suitable for execution within the processor. The microinstructions are then propagated downstream to an allocate stage 16, where processor resources are allocated to the various microinstructions according to availability and need. The microinstructions are then executed at an execute 18 before being retired, or "written-back" (e.g., committed to an architectural state) at a retire stage 20.

Figure 2:
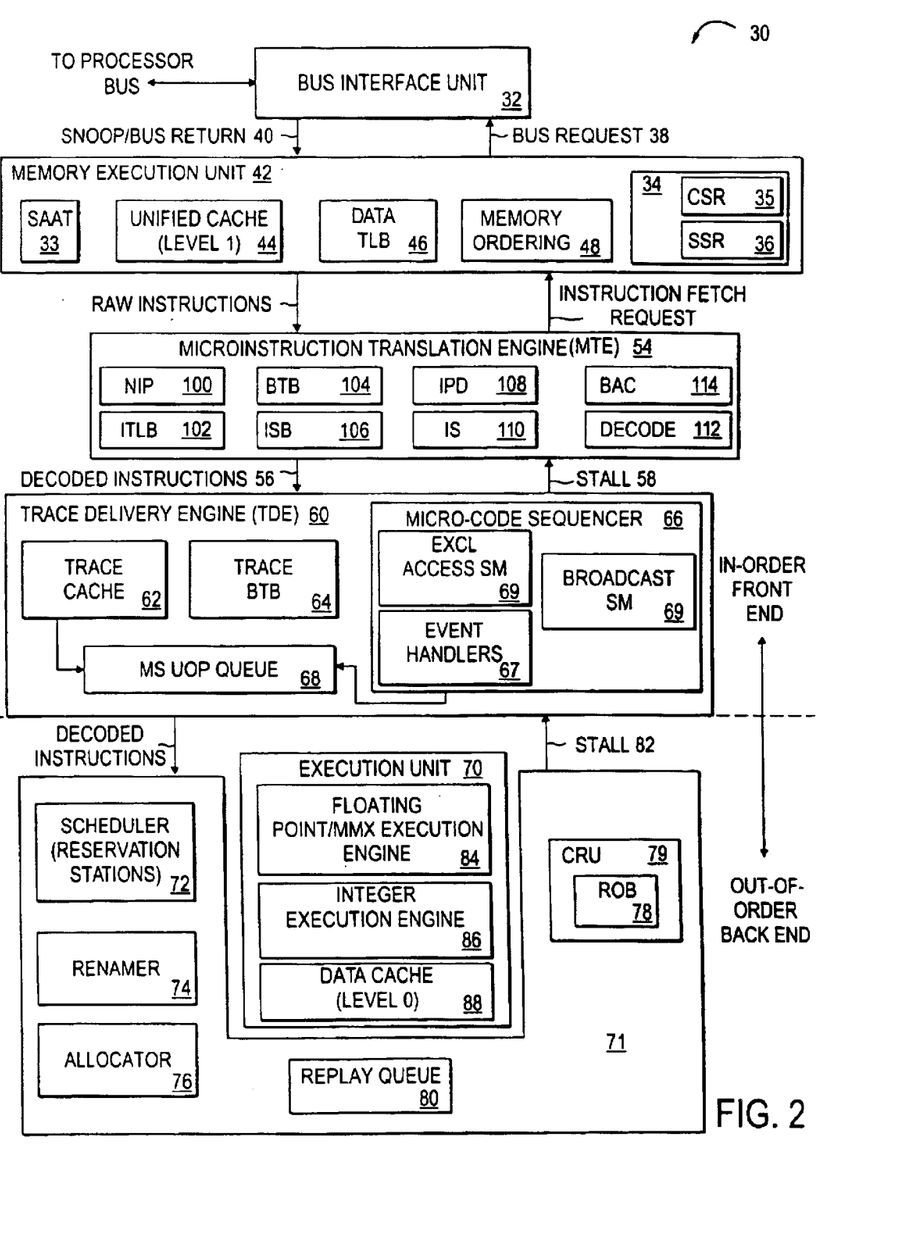
FIG. 2 is a block diagram illustrating an architecture of a microprocessor in which the present invention is implemented.

FIG. 2 is a block diagram illustrating an embodiment of a general-purpose programmable microprocessor ("processor") 30 that may implement pipeline 10. The processor 30 is described herein as being a multithreaded (MT) processor, and is accordingly able to process multiple instruction threads (or contexts). However, many of the teachings provided herein are not specific to an MT processor, and may find application in a single-threaded processor. In one embodiment, the processor 30 may comprise an Intel Architecture (IA) nucroprocessor capable of executing the IA instruction set, such as manufactured by Intel Corporation of Santa Clara, Calif.

The processor is capable of out-of-order execution of instructions. Accordingly, in one embodiment the processor 30 includes an in-order front end and an out-of-order back end. The in-order front end includes a bus interface unit 32, which functions as the conduit between the processor 30 and other components (e.g., main memory) of a computer system within which the processor 30 may be used. To this end, the bus interface unit 32 couples the processor 30 to a processor bus (not shown) via which data and control information may be received at, and propagated from, the processor 30. The bus interface unit 32 receives bus requests 38 from, and sends snoops or bus returns to, a memory execution unit (MEU) 42 that provides local memory capability within the processor 30. The MEU 42 includes a unified data and instruction cache 44, a data Translation Lookaside Buffer (TLB) 46, and memory ordering buffer 48. The memory execution unit 42 receives instruction fetch requests 50 from, and delivers raw instructions 52 (i.e., coded macroinstructions) to, a microinstruction translation engine 54 that translates the macroinstructions into a corresponding set of microinstructions.

The MEU 42 also includes a segment and address translation unit (SAAT) 33 and a register file 34. The register file 34 includes a number of special-purpose registers used by the processor 30, including a code segment register (CSR) 35 and a stack segment register (SSR) 36. Values stored in the CSR 35 and SSR 36 represent state of the processor 30, which is broadcast to various functional units of the processor 30 at various times.

The microinstruction translation engine 54 effectively operates as a trace cache "miss handler", in that it operates to deliver microinstructions to a trace cache 62 in the event of a trace cache miss. To this end, the microinstruction translation engine 54 functions to provide the fetch and decode pipe stages 12 and 14 in the event of a trace cache miss. The microinstruction translation engine 54 is shown to include a next instruction pointer (NIP) 100, an instruction Translation Lookaside Buffer (ITLB) 102, a branch predictor 104, an instruction streaming buffer 106, an instruction pre-decoder 108, instruction steering logic 110, an instruction decoder 112, and a branch address calculator 114. The next instruction pointer 100, ITLB 102, branch predictor 104 and instruction streaming buffer 106 together constitute a branch prediction unit (BPU). The instruction decoder 112 and branch address calculator 114 together comprise an instruction translate (IX) unit.

The next instruction pointer 100 issues next instruction requests to the unified cache 44. In the exemplary embodiment where the processor 30 comprises a multithreaded microprocessor capable of processing two threads, the next instruction pointer 100 may include a multiplexer ("mux") (not shown) that selects between instruction pointers associated with either the first or second thread for inclusion within the next instruction request issued therefrom. In one embodiment, the next instruction pointer 100 will interleave next instruction requests for the first and second threads on a cycle-by-cycle ("ping pong") basis, assuming instructions for both threads have been requested, and instruction streaming buffer 106 resources for both of the threads have not been exhausted. The next instruction pointer requests may be for 16, 32 or 64-bytes depending on whether the initial request address is in the upper half of a 32-byte or 64-byte aligned line. The next instruction pointer 100 may be redirected by the branch predictor 104, the branch address calculator 114 or by the trace cache 62, with a trace cache miss request being the highest priority redirection request.

When the next instruction pointer 100 makes an instruction request to the unified cache 44, it generates a two-bit "request identifier" that is associated with the instruction request and functions as a "tag" for the relevant instruction request. When returning data responsive to an instruction request, the unified cache 44 returns the following tags or identifiers together with the data:

1. The "request identifier" supplied by the next instruction pointer 100;

2. A three-bit "chunk identifier" that identifies the chunk returned; and
3. A "thread identifier" that identifies the thread to which the returned data belongs.

Next instruction requests are propagated from the next instruction pointer 100 to the instruction ITLB 102, which performs an address lookup operation, and delivers a physical address to the unified cache 44. The unified cache 44 delivers a corresponding macroinstruction to the instruction streaming buffer 106. Each next instruction request is also propagated directly from the next instruction pointer 100 to the instruction streaming buffer 106 so as to allow the instruction streaming buffer 106 to identify the thread to which a macroinstruction received from the unified cache 44 belongs. The macroinstructions from both first and second threads are then issued from the instruction streaming buffer 106 to the instruction pre-decoder 108, which performs a number of length calculation and byte marking operations with respect to a received instruction stream (of macroinstructions). Specifically, the instruction pre-decoder 108 generates a series of byte marking vectors that serve, among other purposes, to demarcate macroinstructions within the instruction stream propagated to the instruction steering logic 110.

The instruction steering logic 110 then utilizes the byte marking vectors to steer discrete macroinstructions to the instruction decoder 112 for the purposes of decoding. Macroinstructions are also propagated from the instruction steering logic 110 to the branch address calculator 114 for the purposes of branch address calculation. Microinstructions are then delivered from the instruction decoder 112 to the trace delivery engine 60.

During decoding, flow markers are associated with each microinstruction into which a macroinstruction is translated. A flow marker indicates a characteristic of the associated microinstruction and may, for example, indicate the associated microinstruction as being the first or last microinstruction in a microcode sequence representing a macroinstruction. The flow markers include a "beginning of macroinstruction" (BOM) and an "end of macroinstruction" (EOM) flow markers. According to the present invention, the decoder 112 may further decode the microinstructions to have shared resource (multiprocessor) (SHRMP) flow markers and synchronization (SYNC) flow markers associated therewith. Specifically, a shared resource flow marker identifies a microinstruction as a location within a particular thread at which the thread may be interrupted (e.g., re-started or paused) with less negative consequences than elsewhere in the thread. The decoder 112, in an exemplary embodiment of the present invention, is constructed to mark microinstructions that comprise the end or the beginning of a parent macroinstruction with a shared resource flow marker as well as intermittent points in longer microcode sequences. A synchronization flow marker identifies a microinstruction as a location within a particular thread at which the thread may be synchronized with another thread responsive to, for example, a synchronization instruction within the other thread.

The decoder 112, in one embodiment, is constructed to mark microinstructions that are located at selected macroinstruction boundaries where state shared among threads coexisting in the same processor can be changed by one thread without adversely impacting the execution of other threads.

From the microinstruction translation engine 54, decoded instructions (i.e., microinstructions) are sent to a trace delivery engine 60. The trace delivery engine 60 includes a trace cache 62, a trace branch predictor (BTB) 64, a microcode sequencer 66 and a microcode (uop) queue 68. The trace delivery engine 60 functions as a microinstruction cache, and is the primary source of microinstructions for a downstream execution unit 70. By providing a microinstruction caching function within the processor pipeline, the trace delivery engine 60, and specifically the trace cache 62, allows translation work done by the microinstruction translation engine 54 to be leveraged to provide increased microinstruction bandwidth. In one embodiment, the trace cache 62 may comprise a 256 set, 8 way set associate memory. The term "trace" refers to a sequence of microinstructions stored within entries of the trace cache 62, each entry including pointers to preceding and proceeding microinstructions comprising the trace. In this way, the trace cache 62 facilitates high-performance sequencing in that the address of the next entry to be accessed for the purposes of obtaining a subsequent microinstruction is known before a current access is complete. Traces may be viewed as "blocks" of instructions that are distinguished from one another by trace heads, and are terminated upon encountering an indirect branch or by reaching one of many present threshold conditions, such as the number of conditioned branches that may be accommodated in a single trace or the maximum number of total microinstructions that may comprise a trace.

The trace cache branch predictor 64 provides local branch predictions pertaining to traces within the trace cache 62. The trace cache 62 and the microcode sequencer 66 provide microinstructions to the microcode queue 68, from where the microinstructions are then fed to an out-of-order execution cluster. The microcode sequencer 66 includes a number of event handlers 67, embodied in microcode, that implement a number of operations within the processor 30 in response to the occurrence of an event such as an exception or an interrupt. The event handlers 67, as will be described in further detail below, are invoked by an event detector 188 included within a register renamer 74 in the back end of the processor 30.

The microcode sequencer 66 also includes a broadcast state machine 69, which is described further below. The broadcast state machine 69 controls which of multiple copies of broadcast state are to be used at any given time by the various functional units of the processor 30.

The processor 30 may be viewed as having an in-order front-end, comprising the bus interface unit 32, the memory execution unit 42, the microinstruction translation engine 54 and the trace delivery engine 60, and an out-of-order back-end that will be described in detail below.

Microinstructions dispatched from the microcode queue 68 are received into an out-of-order cluster 71 comprising a scheduler 72, a register renamer 74, an allocator 76, a microinstruction checker retirement unit (CRU) 79 containing a reorder buffer 78, and a replay queue 80. The scheduler 72 includes a set of reservation stations, and operates to schedule and dispatch microinstructions for execution by the execution unit 70. The register renamer 74 performs a register renaming function with respect to hidden integer and floating point registers (that may be utilized in place of any of the eight general purpose registers or any of the eight floating-point registers, where a processor 30 executes the Intel Architecture instruction set). The allocator 76 operates to allocate resources of the execution unit 70 and the cluster 71 to microinstructions according to availability and need. In the event that insufficient resources are available to process a microinstruction, the allocator 76 is responsible for asserting a stall signal 82, that is propagated through the trace delivery engine 60 to the microinstruction translation engine 54, as shown at 58. Microinstructions, which have had their source fields adjusted by the register renamer 74, are placed in a reorder buffer 78 in strict program order. When microinstructions within the reorder buffer 78 have completed execution and are ready for retirement, they are then removed from a reorder buffer and retrieved in an in-order manner (i.e., according to an original program order). The replay queue 80 propagates microinstructions that are to be replayed to the execution unit 70.

The execution unit 70 includes a floating-point execution engine 84, an integer execution engine 86, and a level 0 data cache 88. In one exemplary embodiment in which is the processor 30 executes the Intel Architecture instruction set, the floating point execution engine 84 may further execute MMX® instructions and Streaming SIMD (Single Instruction, Multiple Data) Extensions (SSEs).

II. Broadcasting State

The processor 30 includes a number of functional units, as described above, such as SAAT 33, ITLB 102, trace cache 62, and CRU 79. Many of these functional units may use broadcast state when processing microinstructions. State is broadcast from the execution unit 70 to the various functional units that require it, via internal buses or other connections within the processor 30.

Figure 3:
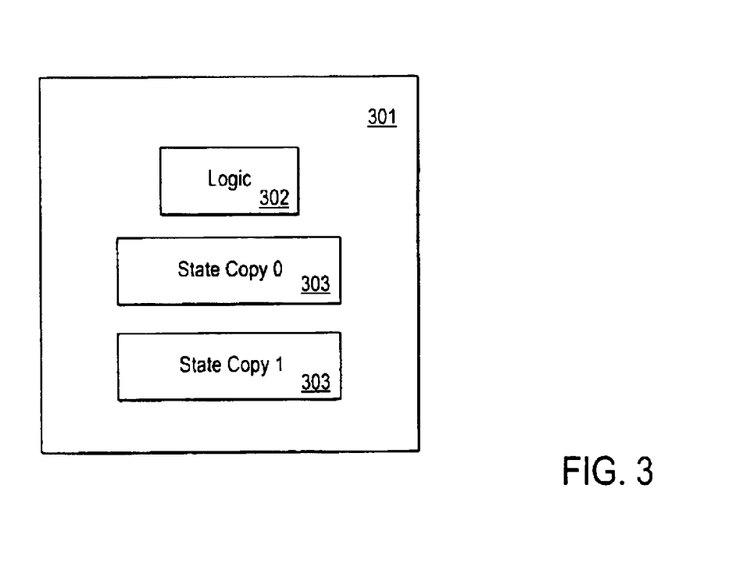
FIG. 3 shows a functional unit of a microprocessor containing multiple copies of broadcast state.

In accordance with the present invention, each functional unit in processor 30 that requires broadcast state (including any of the aforementioned functional units) receives and internally stores multiple different copies of broadcast state. FIG. 3 shows an abstraction of a functional unit 301, representing any functional unit in processor 30 which uses broadcast state. The functional unit 301 includes logic 302 for performing its intended functions. In addition, the functional unit 301 includes multiple different copies 303 of broadcast state, i.e., state copy 0 and state copy 1 in this example, which may be stored within registers in the functional unit 301. Note that in other embodiments, functional units may maintain more than two different copies of broadcast state. However, in this description is assumed that each functional unit maintains two copies, to simplify description.

Figure 4:
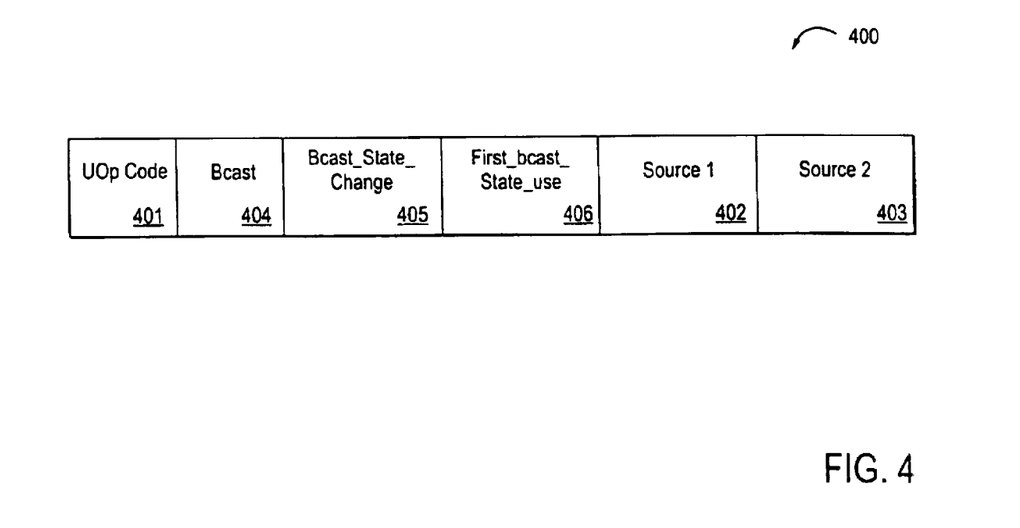
FIG. 4 shows a microinstruction including additional modifiers for use in broadcast state renaming.

FIG. 4 shows an example of the format of a microinstruction to allow broadcast state renaming in accordance with the present invention. As shown, a microinstruction 400 in accordance with the present invention includes a standard uop code 401, a first source field (operand) 402, and a second source field (operand) 403. In addition, the microinstruction 400 includes three additional modifiers for use in broadcast state renaming: a Bcast field 404, a Bcast_State_Change field 405, and a First_Bcast_State_Use field 406.

A Bcast field 404 is included in every microinstruction and indicates to the various functional units which of their multiple internally-stored copies of broadcast state to use when processing that microinstruction. In an embodiment in which only two copies of broadcast state are maintained by each functional unit, the Bcast field 404 may be a single bit ("the Bcast bit"), where each possible value of the Bcast bit corresponds to a different copy of broadcast state. The Bcast field 404 is set by the broadcast state machine 69 in the microcode sequencer 66 in the manner described below, based on the values of the Bcast_State_Change field 405 and the First_Bcast_State_Use field 406.

The Bcast_State_Change field 405 signals the microcode sequencer 66 that the microinstruction will cause a broadcast state change. The First_Bcast_State_Use field 406 indicates that the microinstruction is the first user of a new broadcast state and, therefore, indicates to the microcode sequencer 66 at which microinstruction to stall until a new broadcast state is received and propagated. The Bcast_State_Change field 405 and the First_Bcast_State_Use field 406 are determined by the microcode programmer.

The microcode sequencer 66 stalls whenever the number of state changes in flight equals the number of copies of state maintained by each functional unit. Thus, if the Bcast field 404 is a single-bit field (i.e., two copies of state in each functional unit), the microcode sequencer 66 stalls whenever another broadcast-changing uop (microinstruction) attempts to issue while a broadcast change is in progress. In addition, on every mispredicted macrobranch or microbranch ("branch mispredict"), the execution unit 70 sends the Bcast bit associated with the mispredicted uop to the microcode sequencer 66. The trace cache 62 also sends the Bcast bit to the execution unit 70 for every uop which can use broadcast state and with every mispredictable macrobranch.

Figure 5:
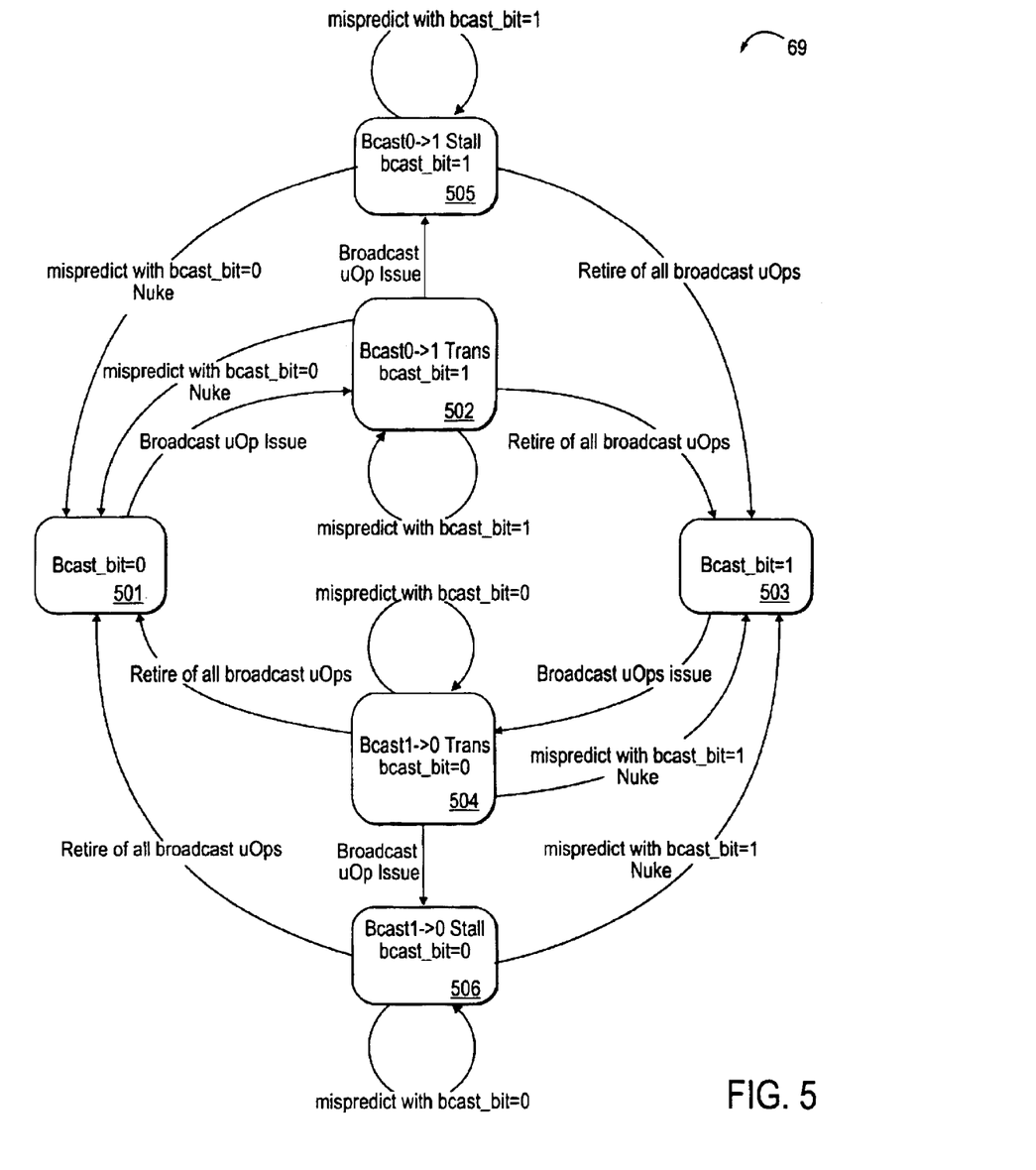
FIG. 5 shows a broadcast state machine implemented in the microcode sequencer.

FIG. 5 shows an embodiment of the broadcast state machine 69 implemented in the microcode sequencer 66, which determines the state of the Bcast field 404 (in this case, the Bcast bit). In state 501, the Bcast bit is equal to 0. When any uop that has its Bcast bit set (a "broadcast uop") issues while the state machine 69 is in state 501, the state machine 69 enters 0-to-1 transition state 502, in which the Bcast bit is about to be set to 1. While in transition state 502, if a branch mispredicts occurs with the Bcast bit equal to 1, there is no change in state. If another broadcast uop issues while in transition state 502, the state machine 69 enters stall state 505, in which microinstruction execution is stalled. While in transition state 502, if a branch mispredicts occurs with the Bcast bit equal to 0, i.e. a "nuke", the state machine 69 transitions back to state 501. A "nuke" may be defined as a state clearing operation which reverts all of the speculative updates in the processor back to non-speculative state. While in transition state 502, if all uops for the broadcast have been retired (some broadcasts may require multiple uops), the state machine 69 transitions to state 503, in which the Bcast bit is set to one.

While in stall state 505, any branch mispredict with the Bcast bit equal to 1 causes no change in state. However, if a branch mispredicts occurs with the Bcast bit equal to 0 while in stall state 505 (a nuke), the state machine 69 transitions back to state 501. If all uops for the broadcast have been retired while in stall state 505, the state machine 69 transitions to state 503, in which the Bcast bit is set to 1.

While in state 503, when a broadcast uop issues, the state machine 69 enters 1-to-0 transition state 504, in which the Bcast bit is about to be set to 0. While in transition state 504, if a branch mispredicts occurs with the Bcast bit equal to 0, there is no change in state. If another broadcast uop issues while in transition state 504, the state machine 69 enters stall state 506, in which microinstruction execution is stalled. While in transition state 504, if a branch mispredicts occurs with the Bcast bit equal to 1 (a nuke), the state machine 69 transitions back to state 503. While in transition state 504, if all uops for the broadcast have been retired, the state machine 69 transitions to state 501, in which the Bcast bit is set to 0.

While in stall state 506, any branch mispredict with the Bcast bit equal to 0 causes no change in state. However, if a branch mispredicts occurs with the Bcast bit equal to 1 while in stall state 506 (a nuke), the state machine 69 transitions back to state 503. If all uops for the broadcast have been retired while in stall state 506, the state machine 69 transitions to state 501, in which the Bcast bit is set to 0.

To implement more than two copies of broadcast state, the CRU 79 can maintain a retirement version of the Bcast field 404 for an event restart, and the microcode sequencer 66 can track the Bcast field allocation as well as the allocation order for misprediction recoveries.

Thus, a method and apparatus for renaming broadcast state in a microprocessor have been described. Although the present has been described with reference to specific exemplary embodiments, it will be evident that various modifications and changes may be made to these embodiments without departing from the broader scope and spirit of the invention. Accordingly, the specification and drawings are to be regarded in an illustrative rather than a restrictive sense.

What is claimed is:

1. A processor comprising:
   a microcode sequencer to set an identifier in a microinstruction, the identifier indicating one of a plurality of copies of broadcast state of the processor; and
   a functional unit to receive and internally store the plurality of copies of broadcast state and to select, based on the identifier, one of the copies of broadcast state for use in processing the microinstruction.

2. A processor as recited in claim 1, further comprising a memory execution unit including a segment register, said broadcast state representing content of the segment register.

3. A processor as recited in claim 2, further comprising a renamer to selectively rename registers of the processor, including the segment register, wherein each of the copies of broadcast state may correspond to a different renamed version of the segment register.

4. A processor as recited in claim 1, further comprising a trace cache to maintain the identifier for at least some of the microinstructions.

5. A processor as recited in claim 1, wherein the microcode sequencer comprises a broadcast state machine to determine the identifier.

6. A processor as recited in claim 1, further comprising a second functional unit to receive and internally store a second plurality of different copies of broadcast state of the processor and to select, based on the identifier in a microinstruction, one of the second plurality of copies of broadcast state for use in processing the microinstruction.

7. A processor comprising:
   means for generating an identifier field in a microinstruction, the identifier field indicating one of a plurality of copies of broadcast state of the processor to be used in processing a microinstruction; and
   a functional unit including
      means for receiving and internally storing the plurality of copies of broadcast state, and
      means for selecting one of the copies of broadcast state indicated by the identifier field, and
      means for processing the microinstruction using the selected copy of broadcast state.

8. A processor as recited in claim 7, further comprising a memory execution unit including a segment register, said broadcast state representing content of the segment register.

9. A processor as recited in claim 8, wherein each of the copies of broadcast state may correspond to a different renamed version of the segment register.

10. A processor as recited in claim 7, further comprising a trace cache to maintain the identifier field for at least some of the microinstructions.

11. A processor comprising:
    a memory execution unit including a segment register, content of the segment register representing state of the processor;
    a microcode sequencer to sequence microinstructions for execution in the processor, including setting an identifier field in at least some of the microinstructions, the identifier field of each such microinstruction indicating one of a plurality of copies of broadcast state of the processor to be used in processing the microinstruction; and
    a functional unit to receive and internally store the plurality of copies of broadcast state and to select, based on the identifier field of a microinstruction, one of the copies for use in processing the microinstruction.

12. A processor as recited in claim 11, further comprising a renamer to selectively rename registers of the processor, including the segment register, wherein each of the copies of broadcast state may correspond to a different renamed version of the segment register.

13. A processor as recited in claim 11, further comprising a trace cache to maintain the identifier field for at least some of the microinstructions.

14. A processor as recited in claim 11, wherein the microcode sequencer comprises a broadcast state machine to determine the identifier field.

15. A processor as recited in claim 11, further comprising a second functional unit to receive and internally store a second plurality of different copies of broadcast state of the processor and to select, based on the identifier field of a microinstruction, one of the second plurality of copies for use in processing the microinstruction.

16. A microprocessor comprising:
    a memory execution unit including a segment register file containing a segment register, content of the segment register representing state of the microprocessor to be broadcast within the microprocessor;
    a renamer to selectively rename registers of the processor, including the segment register;
    a microcode sequencer to sequence microinstructions for execution in the processor, including setting an identifier field in at least some of the microinstructions, the identifier field of each such microinstruction indicating one of a plurality of different copies of broadcast state of the microprocessor to be used in processing the microinstruction, each copy of broadcast state corresponding to a different renamed version of the segment register; and
    a functional unit to receive and internally store the plurality of different copies of broadcast state and to select, based on the identifier field of a microinstruction, one of the copies for use in processing the microinstruction.

17. A processor as recited in claim 16, further comprising a trace cache to maintain the identifier field for at least some of the microinstructions.

18. A processor as recited in claim 16, wherein the microcode sequencer comprises a broadcast state machine to determine the identifier field.

19. A processor as recited in claim 16, further comprising a second functional unit to receive and internally store a second plurality of different copies of broadcast state of the microprocessor and to select, based on the identifier field of a microinstruction, one of the second plurality of copies for use in processing the microinstruction.

20. A method comprising:
    storing a plurality of copies of broadcast state of a processor in each of a plurality of functional units of the processor;
    issuing a microinstruction in the processor, the microinstruction including an identifier; and using the identifier in at least one of the functional units to select one of the plurality of copies of broadcast state for use in processing the microinstruction.

21. A method as recited in claim 20, wherein said broadcast state represents content of a segment register of the processor.

22. A method as recited in claim 21, wherein each of the copies of broadcast state may correspond to a different renamed version of the segment register.

23. A method as recited in claim 20, further comprising using a microcode sequencer of the processor to provide the identifier.

24. A method as recited in claim 20, further comprising using a trace cache of the processor to provide the identifier.

25. A method comprising:
   providing an identifier field in a microinstruction for execution in a processor, the identifier field indicating one of a plurality of copies of broadcast state of the processor to be used in processing the microinstruction;
   storing the plurality of copies of broadcast state in a functional unit of the processor, and
   selecting one of the copies of broadcast state in the functional unit, for use in processing the microinstruction, according to the identifier field of the microinstruction.

26. A method as recited in claim 25, further comprising storing a plurality of copies of broadcast state in each of a plurality of functional units of the processor.

27. A method as recited in claim 25, wherein said broadcast state represents content of a segment register of the processor.

28. A method as recited in claim 27, wherein each of the copies of broadcast state may correspond to a different renamed version of the segment register.

29. A method as recited in claim 25, further comprising using a microcode sequencer of the processor to provide the identifier field.

30. A method as recited in claim 25, further comprising using a trace cache of the processor to provide the identifier field.

* * * * *